US012789392B2

United States Patent
(12) United States Patent
Drewett et al.

(10) Patent No.: US 12,789,392 B2
(45) Date of Patent: Nov. 10, 2026

(54) MARKING END EFFECTORS FOR ROBOTIC SYSTEMS

(71) Applicant: Lockheed Martin Corporation, Bethesda, MD (US)

(72) Inventors: Jeffrey T. Drewett, Kennedale, TX (US); Daniel J. Flanagan, Benbrook, TX (US); Jeffrey P. Langevin, Fort Worth, TX (US); Scott L. Garland, Granbury, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 464 days.

(21) Appl. No.: 18/481,634

(22) Filed: Oct. 5, 2023

(65) Prior Publication Data

US 2025/0114948 A1 Apr. 10, 2025

(51) Int. Cl.
*B25J 15/00* (2006.01)
*B25J 9/10* (2006.01)
*B25J 11/00* (2006.01)

(52) U.S. Cl.
CPC ........... *B25J 15/0019* (2013.01); *B25J 9/109* (2013.01); *B25J 11/005* (2013.01)

(58) Field of Classification Search
CPC ....... B05B 13/0431; B05B 15/68; B25H 7/04; B25J 11/00; B25J 11/0005; B25J 11/0045; B25J 11/005; B25J 11/0055; B25J 11/0065; B25J 11/0075; B25J 13/00; B25J 13/006; B25J 13/06; B25J 13/08; B25J 13/084; B25J 13/088; B25J 13/089; B25J 15/00; B25J 15/0019; B25J 15/0023; B25J 15/0052; B25J 15/0066; B25J 15/02;
(Continued)

(56) References Cited

U.S. PATENT DOCUMENTS 3,916,701 A 11/1975 Butler
4,756,086 A 7/1988 Yajima et al.
(Continued)

FOREIGN PATENT DOCUMENTS

CN 205272977 U 6/2016
CN 205521340 U 8/2016
(Continued)

OTHER PUBLICATIONS

YouTube video entitled "How to Avoid Cross-Threading | Accu Tutorials," 2 pages, uploaded on Oct. 18, 2018 by user "AccuComponents". Retrieved from Internet: <https://www.youtube.com/watch?v=pnx1PgPPCkM>. (Year: 2018).*
(Continued)

*Primary Examiner* — John E Breene
*Assistant Examiner* — Daniel M Quinn
(74) *Attorney, Agent, or Firm* — Baker Botts L.L.P.

(57) ABSTRACT

A marking end effector for a robotic system is disclosed for marking a target surface. The end effector includes a housing including a cylindrical cavity and guide slots. The end effector also includes a marker holder assembly including a cylindrical marker holder and guide bearings. A biasing member is provided between the marker holder assembly and a base of the cavity. The marker holder rotates and translates when the end effector is advanced toward the target surface, and a pattern is correspondingly marked on the surface.

20 Claims, 8 Drawing Sheets

(58) Field of Classification Search

CPC .... B25J 15/04; B25J 15/0408; B25J 15/0425; B25J 15/0441; B25J 15/0483; B25J 15/0491; B25J 17/00; B25J 17/025; B25J 17/0258; B25J 18/00; B25J 18/02; B25J 18/025; B25J 19/0066; B25J 19/007; B25J 19/02; B25J 19/021; B25J 19/023; B25J 9/10; B25J 9/102; B25J 9/104; B25J 9/106; B25J 9/109; B25J 9/126; B25J 9/163; B25J 9/1015; B25J 9/1607; B25J 9/1641; B25J 9/1648; B25J 9/1653; B25J 9/1661; B25J 9/1664; B25J 9/1666; B25J 9/1671; B25J 9/1674; B25J 9/1676; B25J 9/1679; B25J 9/1682; B25J 9/1684; B25J 9/1687; B25J 9/1689; B25J 9/1692; B25J 9/1694; B25J 9/1697; B25J 9/00; B25J 9/0009; B25J 9/0018; B25J 9/0081; B25J 9/0084; B25J 9/0087; B25J 9/04; B25J 9/041; B25J 9/042; B25J 9/046; B25J 9/06; B25J 5/00; B25J 5/007; B25J 3/04; B25J 5/005; B25J 5/04; B41J 3/4073; G01B 11/02; G01B 11/024; G01D 11/24; G01D 5/24442; G05B 19/42; G05B 19/128; G05B 19/401; G05B 19/423; G05B 19/425; G05B 19/4155; G05B 19/00; G05B 2219/23258; G05B 2219/31095; G05B 2219/32025; G05B 2219/35488; G05B 2219/36195; G05B 2219/37009; G05B 2219/37067; G05B 2219/37097; G05B 2219/37129; G05B 2219/37402; G05B 2219/37571; G05B 2219/39008; G05B 2219/39014; G05B 2219/39016; G05B 2219/39021; G05B 2219/39022; G05B 2219/39024; G05B 2219/39031; G05B 2219/39039; G05B 2219/39041; G05B 2219/39045; G05B 2219/39046; G05B 2219/39057; G05B 2219/39087; G05B 2219/39192; G05B 2219/39367; G05B 2219/39391; G05B 2219/39451; G05B 2219/39466; G05B 2219/39468; G05B 2219/40074; G05B 2219/40096; G05B 2219/40099; G05B 2219/40114; G05B 2219/40116; G05B 2219/40195; G05B 2219/40298; G05B 2219/40323; G05B 2219/40395; G05B 2219/40425; G05B 2219/40518; G05B 2219/40595; G05B 2219/40601; G05B 2219/40607; G05B 2219/40609; G05B 2219/40611; G05B 2219/41091; G05B 2219/45013; G05B 2219/45058; G05B 2219/45062; G05B 2219/45066; G05B 2219/45082; G05B 2219/45096; G05B 2219/45104; G05B 2219/45105; G05B 2219/45106; G05B 2219/45117; G05B 2219/45134; G05B 2219/49304; G05B 2219/49305; G05B 2219/49327; G05B 2219/50064; G05B 2219/50391; G05D 1/227; G05D 1/249; G05D 1/0088; G05D 1/0231; H10P 72/7602; Y10S 414/139; Y10S 901/21; Y10S 901/23; Y10S 901/25; Y10S 901/31; Y10S 901/40; Y10S 901/41; Y10S 901/42; Y10S 901/43; Y10S 901/46; Y10S 901/47; Y10S 901/01; Y10S 901/02; Y10S 901/03; Y10S 901/09; Y10T 29/5118; Y10T 29/49826; Y10T 29/49947; Y10T 408/21; Y10T 74/20335

USPC ............. 29/428; 33/18.1; 74/490.03, 490.04, 74/490.05, 490.06; 101/35, 42; 118/300; 219/136; 294/213; 318/568.13, 568.21; 347/20; 414/217, 222.11, 939; 451/6; 600/424; 604/95.01; 606/1, 19; 700/58, 700/59, 159, 160, 186, 245, 246, 248, 700/251, 252, 253, 254, 259, 264; 901/2, 901/3, 9, 21, 23, 25, 29, 30, 35, 41, 42, 901/43

See application file for complete search history.

(56) References Cited

U.S. PATENT DOCUMENTS

| | | | | |
|---|---|---|---|---|
| 5,002,418 | A | 3/1991 | McCown et al. | |
| 5,624,398 | A * | 4/1997 | Smith .................... | A61B 34/70 604/95.01 |
| 9,221,506 | B1 | 12/2015 | Georgeson et al. | |
| 9,434,072 | B2 * | 9/2016 | Buehler ............... | G05B 19/423 |
| 11,607,218 | B2 | 3/2023 | Scheib | |
| 2005/0115421 | A1 * | 6/2005 | Lyons .................... | B41J 3/4073 101/42 |
| 2007/0185595 | A1 * | 8/2007 | Ruden .................... | B25J 9/1692 700/58 |
| 2010/0180711 | A1 * | 7/2010 | Kilibarda ............. | B25J 15/0483 219/136 |
| 2015/0148948 | A1 | 5/2015 | Singh et al. | |
| 2016/0101518 | A1 * | 4/2016 | Saito ........................ | B25J 9/104 901/23 |
| 2016/0207220 | A1 * | 7/2016 | Hack ........................ | B25J 5/005 |
| 2018/0283016 | A1 * | 10/2018 | Telleria ................... | B24B 55/10 |
| 2020/0016758 | A1 * | 1/2020 | Keller .................... | B25J 9/1692 |
| 2020/0155241 | A1 * | 5/2020 | Cascarano ............. | A61B 90/39 |
| 2023/0028732 | A1 | 1/2023 | Ito et al. | |
| 2023/0113580 | A1 | 4/2023 | Bain et al. | |

FOREIGN PATENT DOCUMENTS

| | | | |
|---|---|---|---|
| CN | 107639636 | A * | 1/2018 |
| CN | 208035770 | U | 11/2018 |
| CN | 209566133 | U | 11/2019 |
| CN | 112497228 | A | 3/2021 |
| FR | 3079768 | A1 | 10/2019 |
| JP | 2006062052 | A | 3/2006 |
| JP | 2008264931 | A | 11/2008 |
| WO | 2022047661 | A1 | 3/2022 |

OTHER PUBLICATIONS

YouTube video entitled “How to easily switch rotation direction on a DC electric motor,” 2 pages, uploaded on May 6, 2019 by user “Xynudu”. Retrieved from Internet: <https://www.youtube.com/watch?v =_hk-Tb55pyM>. (Year: 2019).*

Doherty, Shelley. ‘What Is a Threaded Shaft Collar?’. In Stafford Manufatcuring Corp. Blog, [online]. Mar. 17, 2021; 18:43 EST [retrieved on Jun. 13, 2026]. Retrieved from the Internet: <https://web.archive.org/web/20230601011623/https://www.staffordmfg.com/blog/what-is-a-threaded-shaft-collar/>. (Year: 2021).*

Extended European Search Report corresponding to European Patent Application No. 24203015.3 dated Jan. 23, 2025, 7 pages.

* cited by examiner

MARKING END EFFECTORS FOR ROBOTIC SYSTEMS

TECHNICAL FIELD

The present disclosure generally relates to end effectors for robotic systems, and more specifically to end effectors configured for marking patterns on surfaces.

BACKGROUND

End effectors of robotic systems configured for marking surfaces may be used in a variety of situations. As an example, it may be desirable for large numbers of particular distinctive patterns to be rapidly, reliably, and consistently marked on particular reference targets during maintenance inspection. In particular applications, surfaces intended for inspection or marking may not be perfectly even. In some applications, such patterns may be intended to subsequently draw the attention of operational teams or machines, such as for repair, replacement, or additional inspection.

SUMMARY OF PARTICULAR EMBODIMENTS

In particular embodiments, a marking end effector for a robotic system configured to mark a target surface using one or more markers is disclosed, the end effector having a longitudinal axis and including a housing having a proximal end coupled to an end effector base, the housing including a cylindrical cavity provided at a distal end of the housing, the cavity having a cavity wall and a cavity base disposed within the housing; and a first guide slot provided in the cavity wall and including a helical portion; a marker holder assembly operatively coupled to the housing and including: a cylindrical marker holder configured to be received by the cavity; a first guide bearing disposed on the marker holder, the first guide bearing supported by a first bearing axle operatively coupled to the marker holder; and one or more marker bores provided within the marker holder and circumferentially distributed about the longitudinal axis, each marker bore configured to receive a respective marker of the one or more markers; and a marker holder biasing member provided between the cavity base and the marker holder assembly and configured to apply a longitudinal biasing force on the marker holder assembly, wherein the first guide bearing is configured to operatively engage with the first guide slot of the housing to support and guide a motion of the marker holder relative to the housing, and wherein, based on placing a first contacting marker of the one or more markers in contact with the target surface and advancing the end effector toward the target surface, the marker holder is configured to rotate about the longitudinal axis of the end effector in an initial direction while translating toward the cavity base of the housing, and the first contacting marker marking the target surface with at least a portion of first indicia, the first indicia centered about the longitudinal axis of the end effector.

In particular embodiments, which may combine the features of some or all of the above embodiments, based on withdrawing the end effector away from the target surface subsequent to advancing the end effector toward the target surface, the marker holder resets by rotating opposite to the initial direction while translating away from the cavity base of the housing. In particular embodiments, which may combine the features of some or all of the above embodiments, the marker holder assembly further includes a locking mechanism provided at a distal end of the marker holder, the locking mechanism including one or more marker bores and configured to constrain and secure the one or more markers relative to the marker holder assembly.

In particular embodiments, which may combine the features of some or all of the above embodiments, the locking mechanism further includes one or more selectively lockable members configured to selectively apply a lateral force to constrain and secure the one or more markers relative to the marker holder assembly based on locking the locking mechanism. In particular embodiments, which may combine the features of some or all of the above embodiments, one or more of the selectively lockable members includes a threaded shaft cooperatively engaged with a threaded bore.

In particular embodiments, which may combine the features of some or all of the above embodiments, the housing further includes one or more second guide slots provided in the cavity wall, each guide slot including a helical portion, the marker holder assembly further including one or more second guide bearings circumferentially provided on the marker holder, each guide bearing supported by a respective second bearing axle operatively coupled to the marker holder, wherein each second guide bearing is configured to operatively engage with a respective second guide slot of the housing to support and guide a motion of the marker holder relative to the housing. In particular embodiments, which may combine the features of some or all of the above embodiments, each marker bore is disposed parallel to the longitudinal axis, wherein each marker bore is radially offset from the longitudinal axis by a radial offset distance, and wherein the first indicia centered about the longitudinal axis includes a first radius equal to the radial offset distance.

In particular embodiments, which may combine the features of some or all of the above embodiments, an end effector further includes a second contacting marker of the one or more markers, the first contacting marker and the second contacting marker configured to apply a pattern on the target surface including at least a portion of a circle, the pattern centered about the longitudinal axis of the end effector and having a first radius equal to the radial offset distance, based on placing the first contacting marker and the second contacting marker in contact with the target surface and advancing the end effector toward the target surface. In particular embodiments, which may combine the features of some or all of the above embodiments, an end effector includes a plurality of second contacting markers.

In particular embodiments, which may combine the features of some or all of the above embodiments, the marker holder assembly further includes a marker holder bottom plate provided at a proximal end of the marker holder, and wherein the marker holder biasing member engages the marker holder bottom plate to apply the longitudinal biasing force. In particular embodiments, which may combine the features of some or all of the above embodiments, an end effector, the marker holder bottom plate includes a marker alignment assembly configured to permit the first contacting marker and the second contacting marker to independently adjust for operatively engaging with an uneven target surface or an angled target surface. In particular embodiments, which may combine the features of some or all of the above embodiments, the marker holder bottom plate includes a marker spring and a marker spring plate for each of the first contacting marker and the second contacting marker to facilitate an independent axial extension or compression of each of the first contacting marker and the second contacting marker relative to a reference distal face of the end effector.

In particular embodiments, which may combine the features of some or all of the above embodiments, based on withdrawing the end effector away from the target surface subsequent to advancing the end effector toward the target surface, the first contacting marker and the second contacting marker are realigned with an equal axial extension relative to the reference distal face of the end effector.

In particular embodiments, which may combine the features of some or all of the above embodiments, a robotic system is disclosed that includes a memory; a processor in communication with the memory; a robot in communication with the processor and configured to manipulate one or more end effectors based on communication with the processor, the robot including: a marking end effector configured to mark a target surface using one or more markers, the end effector having a longitudinal axis and including: a housing having a proximal end coupled to an end effector base and including: a cylindrical cavity provided at a distal end of the housing, the cavity having a cavity wall and a cavity base disposed within the housing; and a first guide slot provided in the cavity wall and including a helical portion; a marker holder assembly operatively coupled to the housing and including: a cylindrical marker holder configured to be received by the cavity; a first guide bearing disposed on the marker holder, the first guide bearing supported by a first bearing axle operatively coupled to the marker holder; and one or more marker bores provided within the marker holder and circumferentially distributed about the longitudinal axis, each marker bore configured to receive a respective marker of the one or more markers; and a marker holder biasing member provided between the cavity base and the marker holder assembly and configured to apply a longitudinal biasing force on the marker holder assembly, wherein the first guide bearing is configured to operatively engage with the first guide slot of the housing to support and guide a motion of the marker holder relative to the housing, and wherein, based on placing a first contacting marker of the one or more markers in contact with the target surface and advancing the end effector toward the target surface, the marker holder is configured to rotate about the longitudinal axis of the end effector in an initial direction while translating toward the cavity base of the housing, and the first contacting marker applies at least a portion of first indicia on the target surface, the first indicia centered about the longitudinal axis of the end effector.

In particular embodiments, which may combine the features of some or all of the above embodiments, each marker bore is disposed parallel to the longitudinal axis, wherein each marker bore is radially offset from the longitudinal axis by a radial offset distance, and wherein the first indicia centered about the longitudinal axis includes a first radius equal to the radial offset distance. In particular embodiments, which may combine the features of some or all of the above embodiments, a robotic system further includes a second contacting marker of the one or more markers, the first contacting marker and the second contacting marker configured to apply a circular pattern on the target surface, the circular pattern centered about the longitudinal axis of the end effector and having a first radius equal to the radial offset distance, based on placing the first contacting marker and the second contacting marker in contact with the target surface and advancing the end effector toward the target surface. In particular embodiments, which may combine the features of some or all of the above embodiments, a robotic system includes a plurality of second contacting markers.

In particular embodiments, which may combine the features of some or all of the above embodiments, a method of operating a robotic system having a marking end effector is disclosed, the method including: aligning a longitudinal axis of the marking end effector with a target on a target surface; providing initial contact of a plurality of markers with the target surface, each marker of the plurality of markers secured within a cylindrical marker holder and circumferentially distributed about the longitudinal axis, the marker holder received by a cavity of a housing of the end effector, wherein a plurality of guide bearings coupled to marker holder are respectively supported and guided by guide slots provided in the cavity, each guide slot including a helical portion and configured to permit a rotation and a translation of the marker holder relative to the housing; advancing the marking end effector toward the target surface along the longitudinal axis; mechanical aligning the marker holder to rotate about the longitudinal axis in an initial direction while translating toward a base of the cavity of the housing, the mechanical alignment based on advancing the marking end effector; marking the target surface using one or more of the plurality of markers with a pattern including at least a portion of a circle, the pattern centered about the longitudinal axis; withdrawing the marking end effector away the target surface along the longitudinal axis; and mechanical realigning the marker holder to reset by rotating the marker holder opposite to the initial direction while translating the marker holder away from the base of the cavity, the mechanical realignment based on withdrawing the marking end effector.

In particular embodiments, which may combine the features of some or all of the above embodiments, the method further includes separately aligning each marker of the plurality of markers, the separate alignment permitted by a marker alignment assembly provided within a marker holder bottom plate and facilitating operative engagement of the plurality of markers with an uneven target surface, an angled target surface, a non-planar surface, a contoured surface, and/or a flat planar surface. In particular embodiments, which may combine the features of some or all of the above embodiments, the separate alignment includes an independent axial extension or compression of each marker, and the marker alignment assembly includes a marker spring and a marker spring plate.

BRIEF DESCRIPTION OF THE DRAWINGS

To assist in understanding the present disclosure, reference is now made to the following description taken in conjunction with the accompanying drawings, in which.

DESCRIPTION OF EXAMPLE EMBODIMENTS

To facilitate a better understanding of the present disclosure, the following examples of certain embodiments are given. The following examples are not to be read to limit or define the scope of the disclosure.

Figure 1:
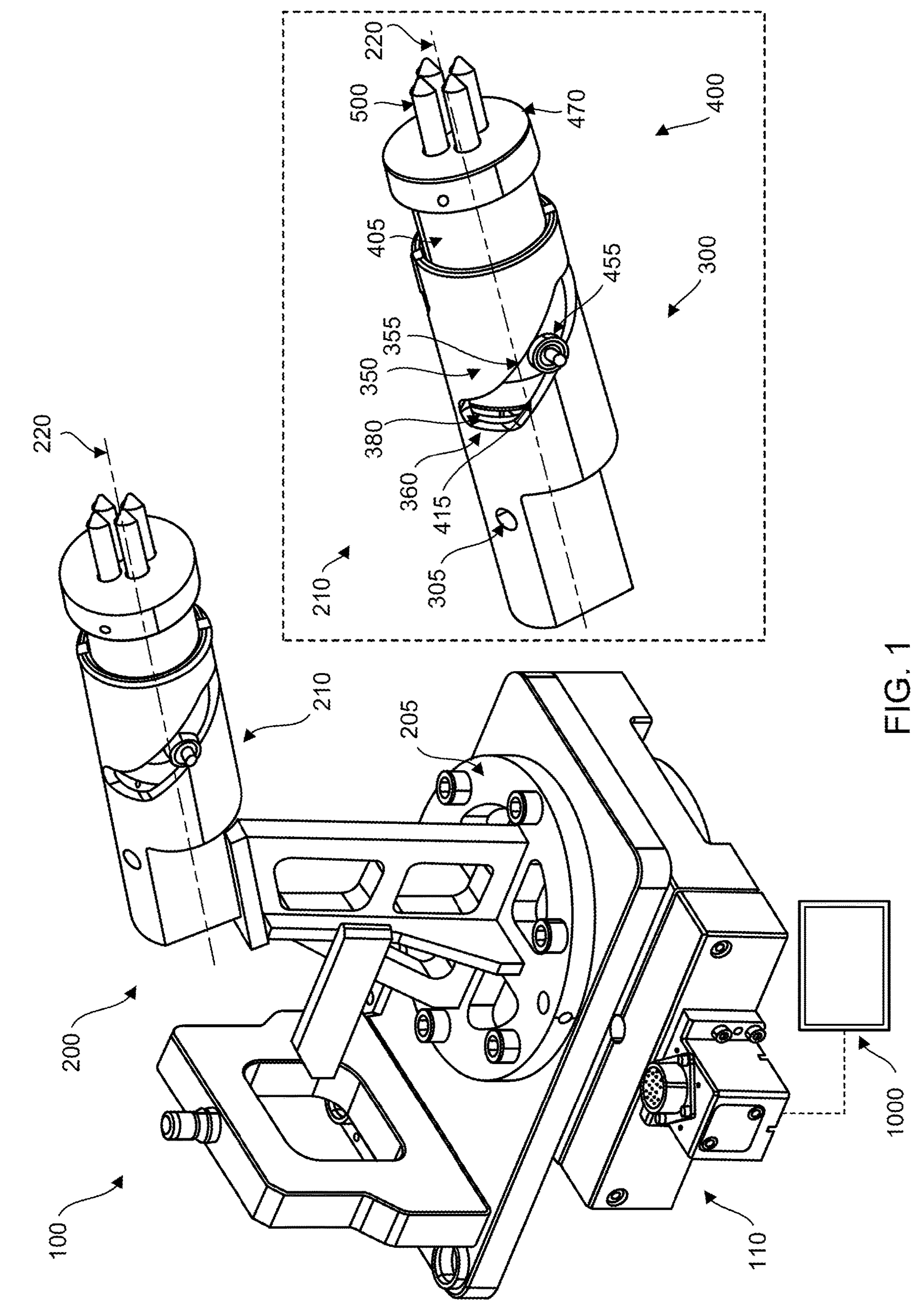
FIG. 1 illustrates a schematic perspective view of a robotic system having an end effector assembly, according to particular embodiments, with an inset illustrating an enlarged view of the end effector assembly.

In accordance with various embodiments of the present disclosure, various mechanisms, assemblies, arrangements, and methods of assembly, manufacture, and/or operation of end effectors for robotic systems are disclosed herein. With reference to the figures, FIG. 1 illustrates a schematic perspective view of a robotic system 100 having an end effector assembly 200, according to particular embodiments, with an inset illustrating an enlarged view of a marking end effector 210.

In particular embodiments, robotic system 100 may be communicatively coupled to a computing system 1000. In particular embodiments, robotic system 100 can be configured for allowing control of its position and/or motion along and/or about one or more axes. In particular embodiments, robotic system 100 may be provided with one or more arms, actuators, and/or other suitable features for allowing one or more degrees of freedom of motion. In particular embodiments, robotic system 100 may include or be in communication with suitable devices, sensors, and/or other suitable features for capturing, processing, interpreting, and/or acting on external information. By way of example and not limitation, robotic system 100 may be communicatively coupled to one or more cameras via computing system 1000, wherein computing system 1000 may use image processing software to process a video and/or image input stream. In particular embodiments, robotic system 100 may process the input stream to determine a signal output, and may use a suitable signal output to operate particular actuators of robotic system 100 to provide desired position and/or motion.

In particular embodiments, robotic system 100 may include an end effector assembly 200 directly or indirectly coupled to an end effector base 205. By way of example and not limitation, end effector base 205 may be operatively coupled to a robotic system platform 110. In particular embodiments, end effector assembly 200 may comprise a marking end effector 210.

It will be appreciated that while particular configurations and features of robotic system 100 are described and/or illustrated herein for providing a better understanding, this disclosure contemplates any suitable configurations and features for features and/or configurations of robotic system 100. By way of example and not limitation, robotic system 100 may include additional arms, actuators, and/or sensors. By way of example and not limitation, robotic system 100 may provide, or be combined with, functions and structures of robotic systems for additional purposes not specifically disclosed herein.

Figure 2:
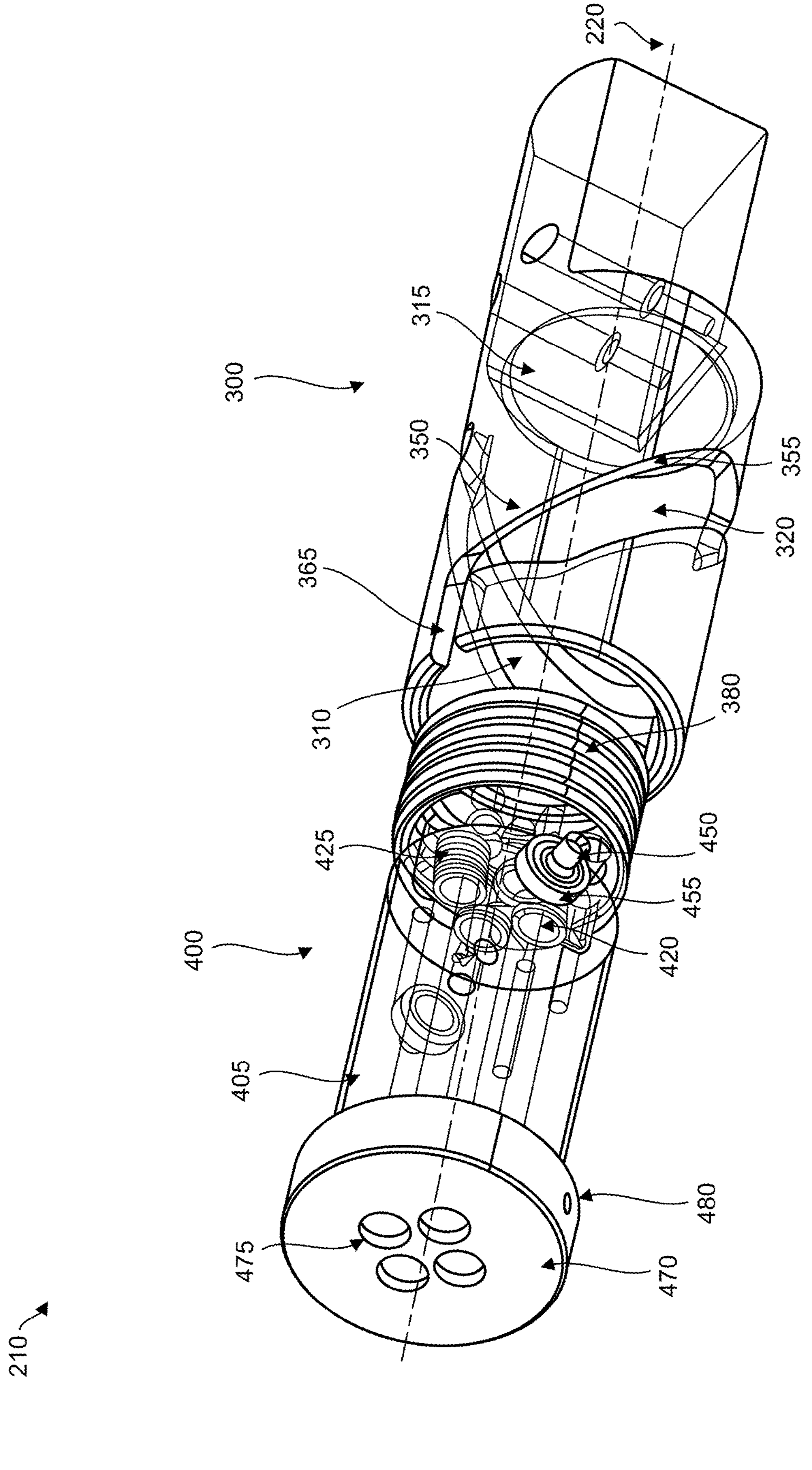
FIG. 2 illustrates a schematic perspective view of a marking end effector assembly for a robotic system, according to particular embodiments, with specific internal features depicted in phantom view.
Figure 3:
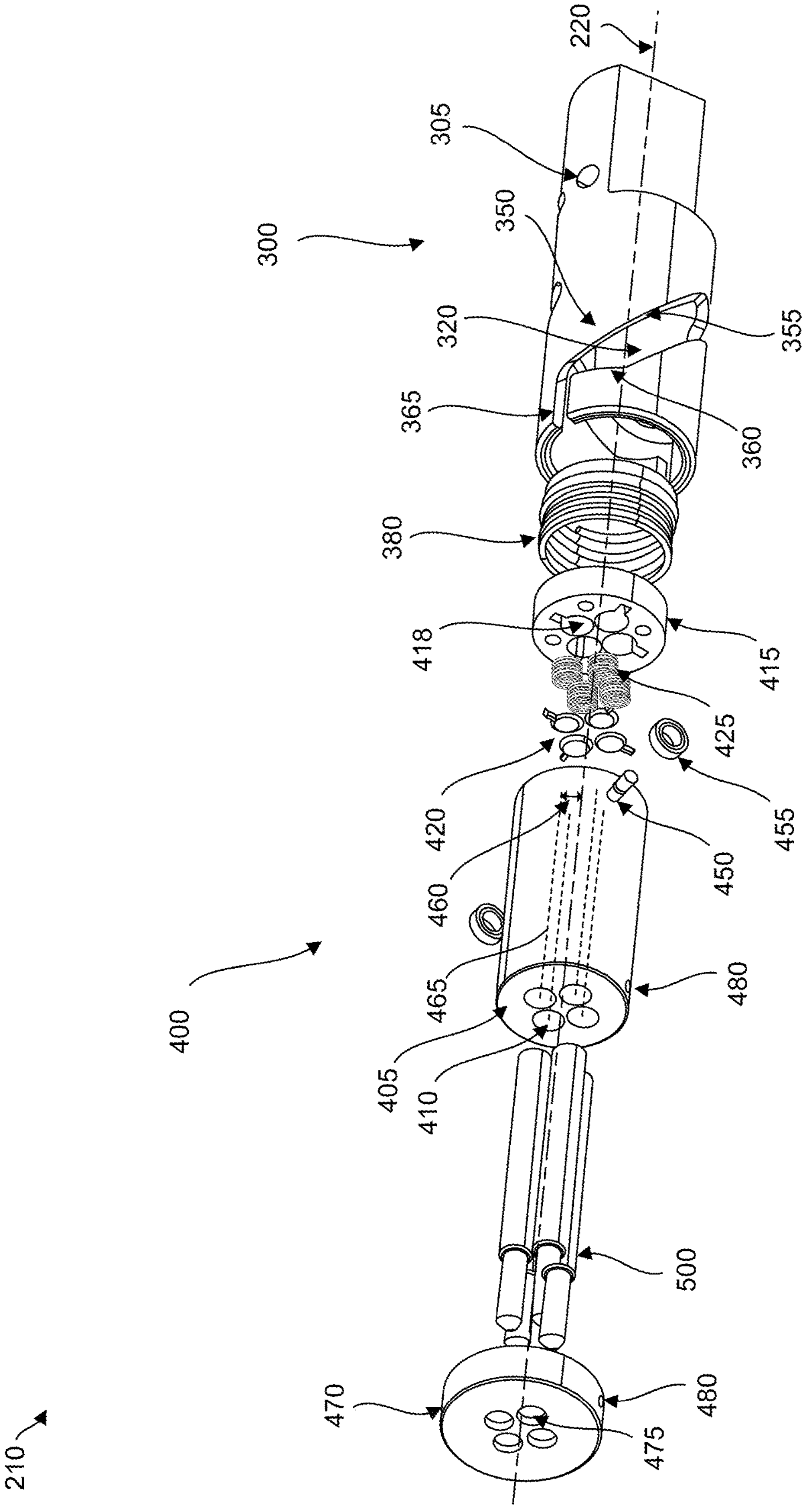
FIG. 3 illustrates a schematic exploded perspective view of a marking end effector assembly for a robotic system, according to particular embodiments.

FIG. 2 illustrates a schematic perspective view of a marking end effector assembly for a robotic system, according to particular embodiments, with specific internal features depicted in phantom view. FIG. 3 illustrates a schematic exploded perspective view of a marking end effector assembly for a robotic system, according to particular embodiments.

In particular embodiments, marking end effector 210 may include a housing 300. In particular embodiments, housing 300 may be directly or indirectly coupled to end effector base 205 via one or more coupling features 305. By way of example and not limitation, coupling features 305 may include one or more bores combined with suitable fasteners to couple marking end effector 210 to a suitable member, such as a rigid member of end effector base 205, or an actuator base of robotic system platform 110. By way of example and not limitation, a bore of coupling features 305 may be threaded or unthreaded, and/or may include steps based on multiple bore diameters.

In particular embodiments, a portion of housing 300 may be provided with a cavity 310. By way of example and not limitation, a portion of housing 300 may be cylindrical in cross-section. Accordingly, in particular embodiments, cavity 310 may be a cylindrical cavity. In particular embodiments, cavity 310 may include a cavity base 315 and a cavity wall 320.

In particular embodiments, housing 300 may include one or more guide slots 350 provided in cavity wall 320. In particular embodiments, one or more guide slots 350 may comprise rails, indents, grooves, and/or other suitable guiding features. By way of example and not limitation, parts or a full extent of guide slots 350 may pass through a thickness of cavity wall 320. By way of example and not limitation, parts of, or a full extent of, guide slots 350 may penetrate a fraction of the thickness of cavity wall 320.

In particular embodiments, guide slots 350 may be helical or spiral-shaped, so that an overall form of guide slots 350 may comprise portions having an axial extent along a longitudinal axis 220 of marking end effector 210, portions having a circumferential extent swept around a longitudinal axis 220 of marking end effector 210, or portions having both an axial extent and a circumferential extent. As will be further described herein, in particular embodiments, guide slots 350 may guide and/or support suitable components to rotate about a longitudinal axis 220 of marking end effector 210, and/or translate along a longitudinal axis.

By way of example and not limitation, guide slots 350 may comprise one or more angled portions 355 that may simultaneously comprise both circumferential and longitudinal components. By way of example and not limitation, guide slots 350 may comprise one or more lateral portions 360 that may be oriented perpendicular to a longitudinal axis of the marking end effector 210. By way of example and not limitation, guide slots 350 may comprise longitudinal portions 365 that may be oriented parallel to a longitudinal axis of the marking end effector 210. By way of example and not limitation, a suitable combination of angled portion(s) 355, lateral portion(s) 360, and/or longitudinal portion(s) 365 of guide slots 350 may be used to control relative rates of rotation and translation, for providing ease of assembly, for controlling longitudinal compression, for providing rest zones, and/or for providing motion stops for components guided and/or supported by guide slots 350.

In particular embodiments, marking end effector 210 may comprise a marker holder assembly 400. In particular embodiments, marker holder assembly 400 may be operatively coupled to housing 300, and/or partially received within cavity 310 of housing 300. In particular embodiments, a marker holder assembly spring 380 may be provided between cavity base 315 and a proximal portion of marker holder assembly 400. By way of example and not limitation, marker holder assembly spring 380 may be configured to apply a biasing force on a portion of marker holder assembly 400, such as marker holder bottom plate 415. By way of example and not limitation, a biasing force applied by marker holder assembly spring 380 may be aligned with a longitudinal axis 220 of marking end effector 210.

In particular embodiments, marker holder assembly 400 may comprise a marker holder 405. By way of example and not limitation, marker holder 405 may be cylindrical, and/or otherwise configured to be received by or within cavity 310 of housing 300. In particular embodiments, marker holder 405 may comprise one or more marker holder bores 410. In particular embodiments, a shortest distance or radial offset distance 460 between a bore axis 465 of a marker 500 and a longitudinal axis 220 of marking end effector 210 may be equal for all markers 500. In particular embodiments, radial offset distance 460 may be unequal between different markers 500. Separately or additionally, in particular embodiments, radial offset distance 460 for a given marker 500 may be uniform along a longitudinal axis 220 of marking end effector 210, which may correspond to a marker 500 being parallel to the longitudinal axis 220 of marking end effector 210. In particular embodiments, radial offset distance 460 for a given marker 500 may vary along a longitudinal axis 220 of marking end effector 210.

By way of example and not limitation, marker holder bores 410 may be cylindrical and uniform in cross-sectional area, or non-uniform, or any suitable shape to receive, support, secure, and/or accommodate suitable marking components or devices, called “markers” herein, for marking a surface. By way of example and not limitation, marker holder bores 410 may be oriented parallel to a longitudinal axis 220 of marking end effector 210, or at an angle.

Figure 7:
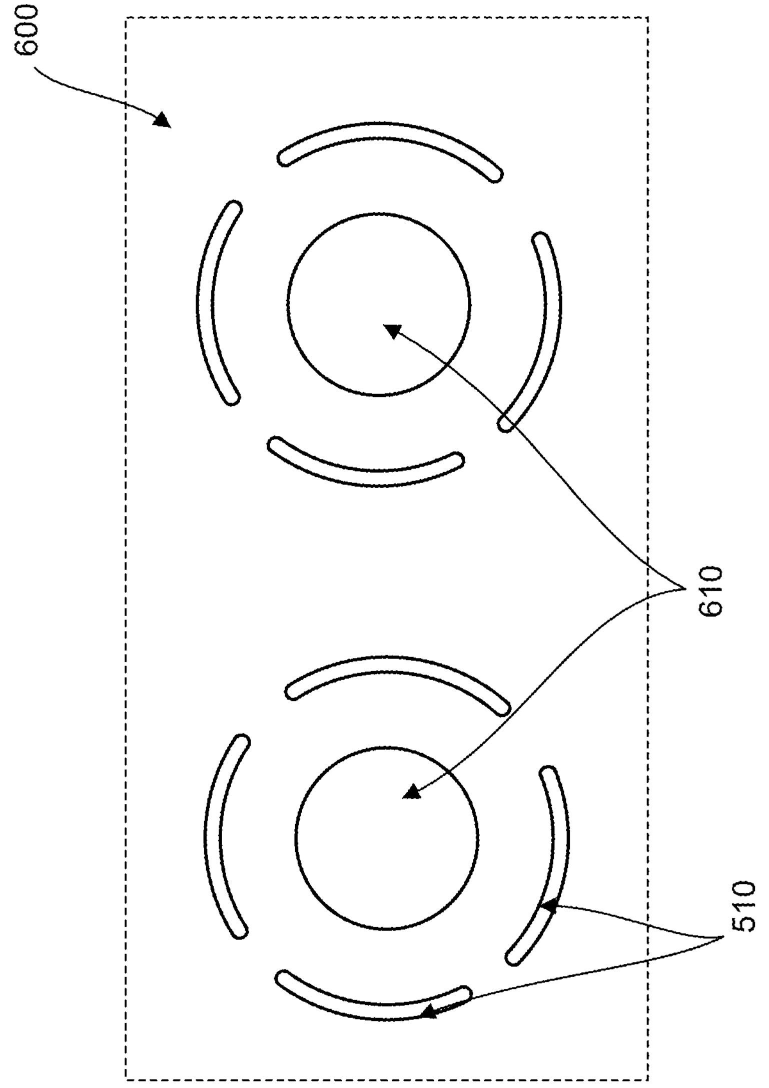
FIG. 7 illustrates schematic exemplary indicia applied on a target surface, according to particular embodiments.

While this disclosure may describe and/or illustrate particular markers and marking methods to provide a better understanding, it will be appreciated that this disclosure contemplates all suitable markers and marking methods for marking a surface. By way of example and not limitation, “marking” may include methods comprising addition or transfer of material to a surface, such as imprinting, printing, layering, fusing, bonding, sputtering, spraying, and/or other application of dyes, inks, polymers, 3D printing materials, or other chemicals, and/or removal or modification of material, such as by etching, engraving, inscribing, scoring, indenting, photochemically reacting, ablating, and/or action on via a laser or other suitable tool or method. Similarly, “markers” may be any suitable instruments to provide or impart such marking on a surface of interest, and “marks” may made by any suitable marking method, including but not limited to the examples provided herein for illustration. For instance, several figures herein depict exemplary markers 500 by way of illustration and not limitation. Similarly, FIG. 7 depicts schematic exemplary marker marks 510 by way of illustration and not limitation.

In particular embodiments, a suitable component of marker holder assembly 400, such as marker holder 405, may be provided with one or more bearings, or other suitable components, to facilitate relative motion of marker holder assembly 400 with respect to housing 300. By way of example and not limitation, a pair of guide bearings 455 may be operatively coupled to marker holder 405 on corresponding bearing axles 450 provided at diametrically opposite portions of marker holder 405. By way of example and not limitation, guide bearings 455 may be linear bearings, and/or roller bearings, or any suitable type and configuration of bearings for supporting the motion of marker holder assembly 400 relative to housing 300 of marking end effector 210, as described herein. In an assembled state of marking end effector 210, the one or more guide bearings 455 may be guided and/or supported by one or more corresponding guide slots 350 of housing 300.

Figure 4:
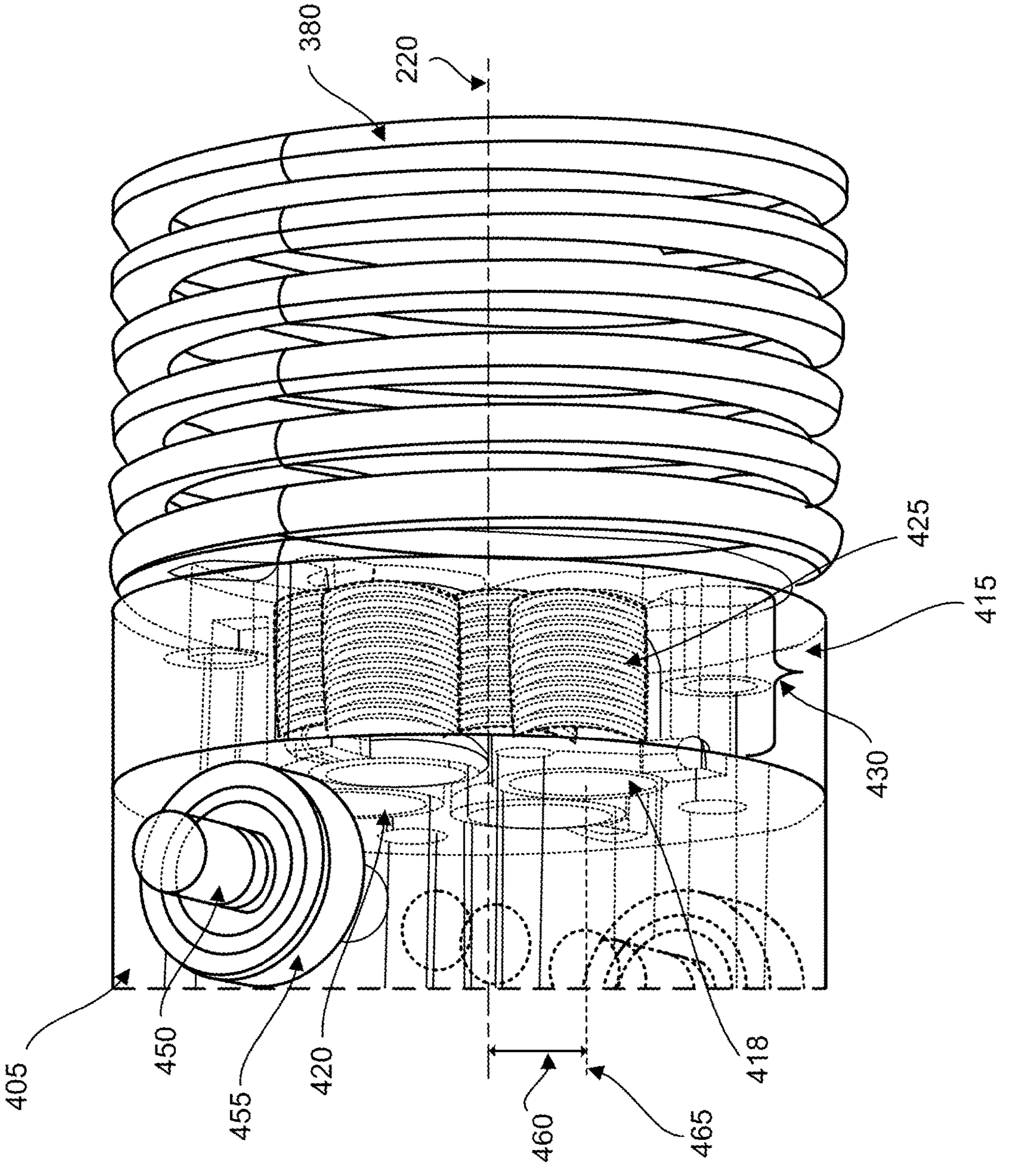
FIG. 4 illustrates a schematic perspective view of a portion of a marking end effector assembly for a robotic system, according to particular embodiments, with specific internal features depicted in phantom view.

FIG. 4 illustrates a schematic perspective view of a portion of a marking end effector assembly for a robotic system, according to particular embodiments, with specific internal features depicted in phantom view.

In particular embodiments, marker holder assembly 400 may comprise a marker holder bottom plate 415. In particular embodiments, marker holder bottom plate 415 may be supported on a proximal side. By way of example and not limitation, a proximal side of marker holder bottom plate 415 may be facially and/or circumferentially supported by marker holder assembly spring 380. In particular embodiments, marker holder bottom plate 415 may comprise a marker alignment assembly configured to permit one or more markers 500 to operatively engage with an uneven target surface or an angled target surface. By way of example and not limitation, a marker alignment assembly may comprise one or more spring and/or plates aligned and cooperatively operating with marker holder bores 410. By way of example and not limitation, a distal side of marker holder bottom plate 415 may comprise one or more marker support cavities. By way of example and not limitation, each marker support cavity 418 may correspond to an interfacing marker holder bore 410 of marker holder 405. In particular embodiments, each marker support cavity 418 may comprise a cavity depth 430. In particular embodiments, each marker cavity support may include one or more suitable components configured to engage, support, constrain, and/or guide a corresponding marker 500. By way of example and not limitation, suitable components provided in a marker support cavity 418 may comprise a marker spring plate 420 and/or a marker spring 425. By way of example and not limitation, suitable components provided in a marker support cavity 418 may cooperate to permit individual markers to differentially compress and/or axially translate relative to marker holder 405, and/or relative to each other, while providing a suitable contact pressure of marker 500 against a target surface. Accordingly, suitable components provided in a marker support cavity 418 can facilitate or enable each marker 500 to operatively engage with an uneven, non-uniform, and/or angled target surface. By way of example and not limitation, an angled target surface may comprise a surface having a normal direction that is non-parallel to a longitudinal axis 220 of marking end effector 210 at a location of mutual engagement of the surface and marking end effector 210.

In particular embodiments, marker holder assembly 400 may comprise a locking cap 470. By way of example and not limitation, locking cap 470 may be provided at a distal portion of marker holder assembly 400, and/or a distal end of marker holder 405. In particular embodiments, locking cap 470 (see locking cap 470 in FIGS. 1-3 and 5A) may comprise one or more marker holder bores 475 (see marker holder bores 475 in FIGS. 2, 3, and 5A). By way of example and not limitation, the one or more marker holder bores 475 of locking cap 470 may correspond to the one or more marker holder bores 410 of marker holder 405. In particular embodiments, locking cap 470 may be configured to support, align, constrain, and/or secure one, some, or all markers 500 used in marking end effector 210. By way of example and not limitation, when locked, locking cap 470 may constrain lateral or sideways motion of markers 500 relative to locking cap 470, while permitting axial or longitudinal motion of markers 500 relative to locking cap 470. While particular means of constraining one or more markers 500 may be specifically disclosed to provide a better understanding, it should be appreciate that any suitable structural means for constraining one or more markers 500 is fully contemplated in this disclosure. By way of example and not limitation, a locking mechanism may additionally or alternatively comprise spring loaded pins, cam lock pins, and/or ball lock pins.

By way of example and not limitation, in the illustration of FIG. 4, an embodiment is depicted having parallel and uniformly distributed marker support cavities 418, wherein each marker support cavity 418 corresponds to a marker holder bore 410, with an axis of marker support cavity 418 aligned with a corresponding bore axis 465. Accordingly, in this non-limiting example, radial offset distance 460 and/or bore axis 465 may extend or transfer unchanged from marker holder 405 to marker holder bottom plate 415. By way of example and not limitation, the illustration of FIG. 4 depicts extended radial offset distance 460 and bore axis 465 corresponding to a single marker support cavity 418 for reasons of clarity.

Figure 5A:
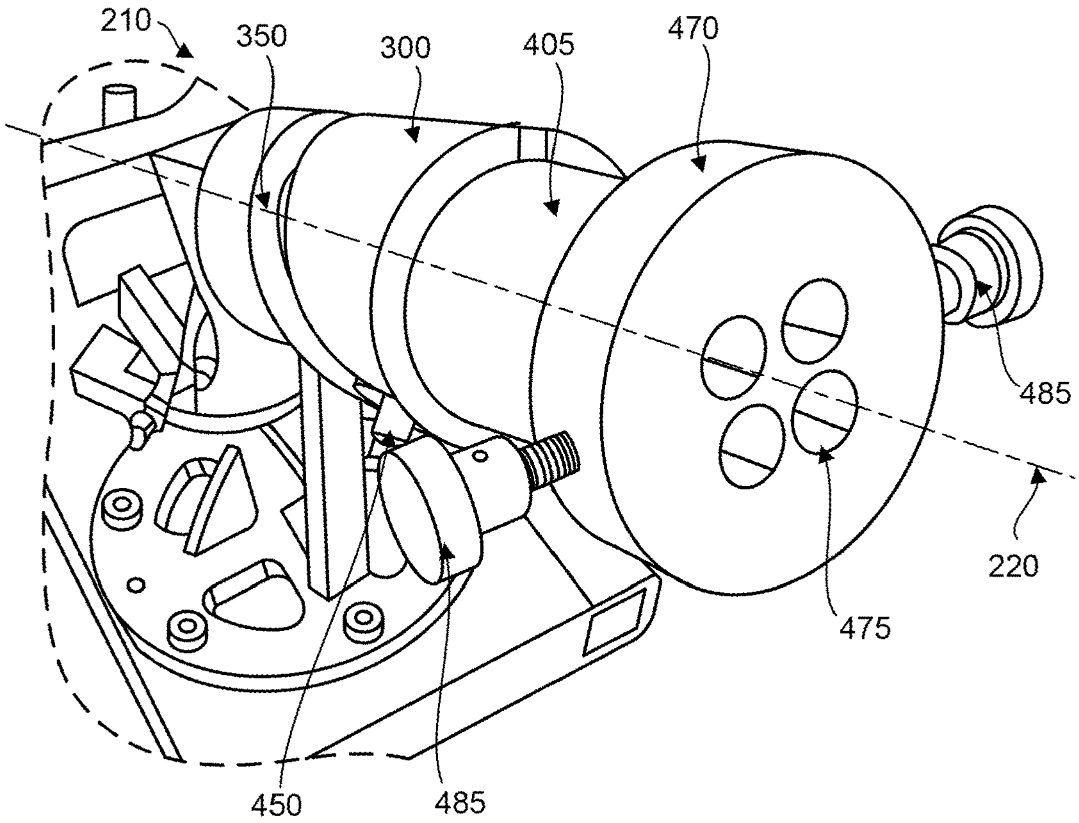
FIGS. 5A-5B illustrate schematic perspective views of a distal portion of a marking end effector assembly for a robotic system, according to particular embodiments, depicting a locking cap installed (5A), and removed (5B).
Figure 5B:
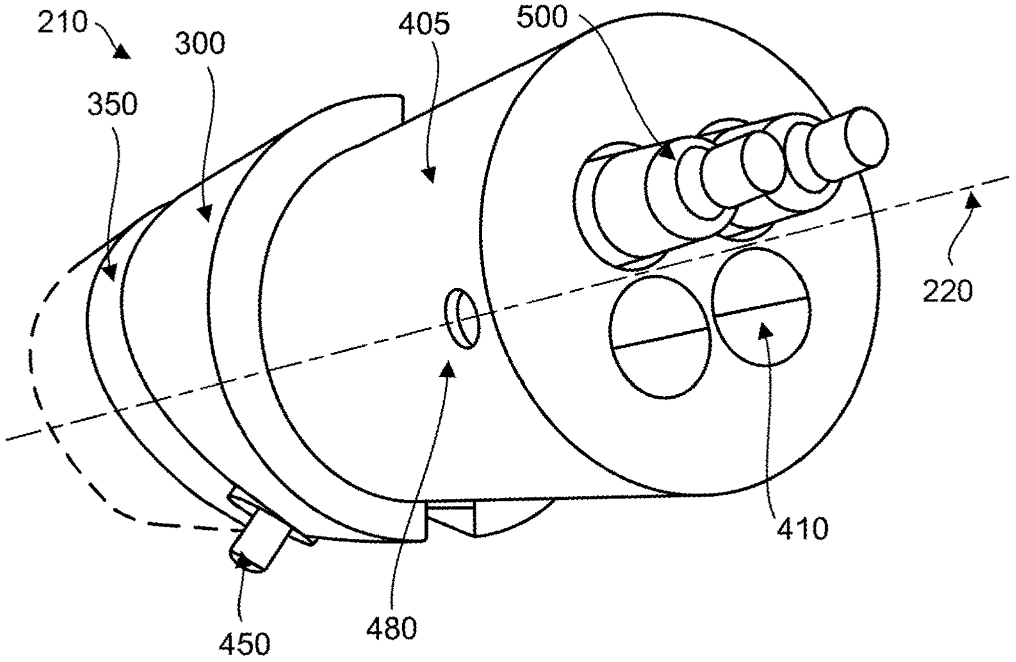

FIGS. 5A-5B illustrate schematic perspective views of a distal portion of a marking end effector assembly for a robotic system, according to particular embodiments, depicting a locking cap installed (5A), and removed (5B).

In particular embodiments, locking cap 470 may comprise one or more locking features. In particular embodiments, locking features may comprise one or more marker holder bores specifically dimensioned and designed to laterally constrain one or more particular markers 500. In particular embodiments, locking features may comprise one or more marker locking apertures 480, and/or one or more marker locking keys 485. By way of example and not limitation, a marker locking aperture 480 may comprise a threaded bore, and a marker locking key 485 may comprise a threaded shaft or bolt, which may be removable. By way of example and not limitation, a threaded bolt can be sized and oriented to apply a lateral or sideways force on one or more markers 500 when said bolt is inserted into a threaded bore and tightened therein, thereby laterally locking the corresponding markers 500 relative to locking cap 470.

By way of example and not limitation, each installed marker 500 may be accommodated or supported by a marker holder bore 410 along its length, by marker support cavity 418 and/or marker spring plate 420 at a proximal end, and/or by a marker holder bore 475 of locking cap 470 at a distal end. Separately or additionally, each locked marker 500 may be laterally engaged and/or constrained by a marker locking key 485 between the proximal and distal ends, such as by application of a lateral or sideways force.

In particular embodiments, marker holder 405 and locking cap 470 may be provided with corresponding one or more marker locking apertures 480, which may be aligned for assembly. In particular embodiments, the same or different threaded parts described in the non-limiting examples above may be used to secure locking cap 470 to marker holder assembly 400, such as to a distal end of marker holder 405. In particular embodiments, assembling locking cap 470 with marker holder 405 may be mechanically identical to, or may be distinct from, locking markers 500 relative to locking cap 470 when markers 500 have been inserted.

Figure 6A:
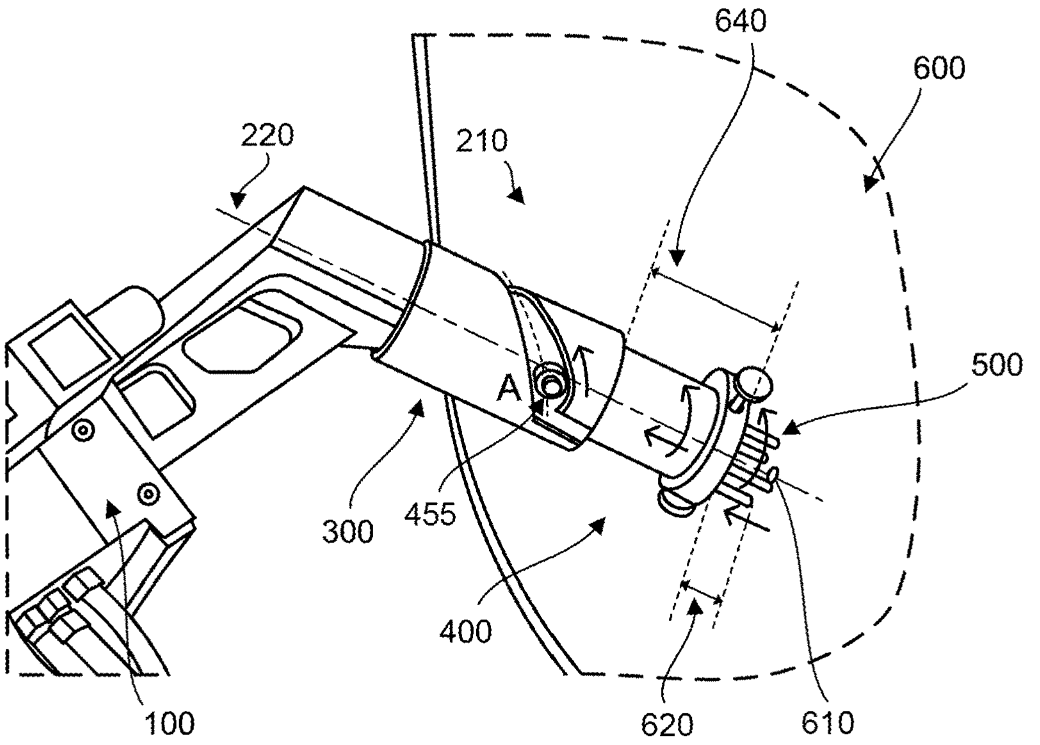
FIGS. 6A-6B illustrate schematic views of a marking end effector assembly for a robotic system, according to particular embodiments, depicting initial contact of markers with a target surface (6A), and subsequent translation and rotation of a marker holder assembly relative to a housing (6B).
Figure 6B:
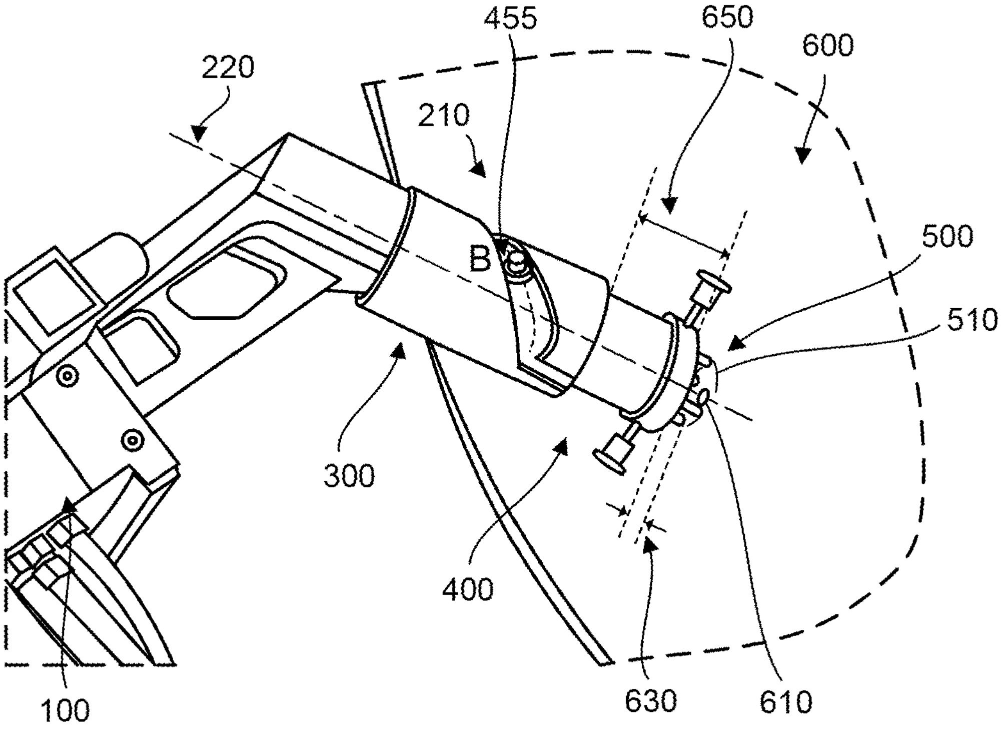

FIGS. 6A-6B illustrate schematic views of a marking end effector assembly for a robotic system, according to particular embodiments, depicting initial contact of markers with a target surface (6A), and subsequent translation and rotation of a marker holder assembly relative to a housing (6B).

In particular embodiments, operating marking end effector 210 may comprise positioning of marking end effector 210 by robotic system 100 against a target 610 located on or within a target surface 600. By way of example and not limitation, positioning marking end effector 210 may comprise making initial contact of one or more installed markers 500 with target surface 600, and/or aligning a longitudinal axis with target 610. By way of example and not limitation, target 610 may comprise a reference marker, or a physical feature of interest, such as a fastener or junction.

As schematically depicted in FIG. 6A, a reference guide bearing 455 depicted in both FIGS. 6A and 6B may be located at a position A in FIG. 6A. A marker extension distance 620 is schematically illustrated at initial contact of one or more markers 500 in FIG. 6A, wherein initial marker extension distance 620 for a given marker 500 corresponds to a projecting portion or tip of that marker 500 extending past or proud of a suitable reference distal face or plane of marker holder assembly 400, such as a flat distal plane or end-face of locking cap 470, when that marker makes initial contact with target surface 600. An initial holder extension distance 640 is schematically illustrated at initial contact, corresponding to a projecting portion of marker holder assembly 400. By way of example and not limitation, holder extension distance 640 may be measured between a distal edge of housing 300 and a flat distal portion of marker holder assembly 400.

In particular embodiments, once marking end effector 210 is positioned against target 610 located on or within target surface 600, with one or more markers 500 making initial contact as desired, robotic system 100 may advance, translate, or otherwise move marking end effector 210 toward target surface 600. By way of example and not limitation, robotic system 100 may advance marking end effector 210 along a longitudinal axis 220 of marking end effector 210 which was centered on target 610 during positioning.

In particular embodiments, as indicated by arrows in FIG. 6A, one or more markers 500 may independently axially translate relative to marker holder 405, and/or each other, based on reaction forces independently received by each marker 500 based on respective contact with target surface 600 and advancement of marking end effector 210 toward target surface 600. By way of example and not limitation, a final marker extension distance 630 for a given marker 500 subsequent to initial contact and based on advancing marking end effector 210 toward target surface 600 may be changed when compared to an initial marker extension distance 620 for the same marker. By way of example and not limitation, for an even and planar target surface 600 aligned normal to a longitudinal axis 220 of marking end effector 210, final marker extension distance 630 may be reduced relative to initial marker extension distance 620, for a given marker 500.

In particular embodiments, as indicated by arrows in FIG. 6A, marker holder assembly 400 may translate inward (i.e., toward a proximal end of longitudinal axis 220 of marking end effector 210) relative to housing 300 based on advancing marking end effector 210 toward target surface 600. By way of example and not limitation, a final holder extension distance 650 subsequent to initial contact and based on advancing marking end effector 210 toward target surface 600 may be accordingly reduced when compared to an initial holder extension distance 640. By way of example and not limitation, as an overall length of marking end effector 210 may be reduced based on advancing marking end effector 210 toward target surface 600, marking end effector 210 may be considered to be compressed in the reduced length position relative to its uncompressed configuration at or prior to initial contact of one or more markers 500 with target surface 600.

Separately or additionally, in particular embodiments, as also indicated by arrows in FIG. 6A, marker holder assembly 400 may rotate within and relative to housing 300 and around or about a longitudinal axis, based on advancing marking end effector 210 toward target surface 600. By way of example and not limitation, the reference guide bearing 455 depicted at position A in FIG. 6A may accordingly move or travel to a relatively rotated and more proximal or withdrawn position B at the time instant of FIG. 6B, based on advancing marking end effector 210 toward target surface 600.

Separately or additionally, in particular embodiments, as also indicated by arrows in FIG. 6A, one or more markers 500 of marking end effector 210 in contact with target surface 600 may rotate around or about a longitudinal axis 220 of marking end effector 210, based on advancing marking end effector 210 toward target surface 600. In particular embodiments, one or more contacting markers 500 may mark one or more portions of particular patterns or indicia on target surface 600 based on the respective rotational characteristics of each contacting marker.

In particular embodiments, once a desired pattern or indicia have been marked on target surface 600 by marking end effector 210, robotic system 100 may withdraw marking end effector 210. By way of example and not limitation, withdrawing marking end effector 210 may occur along a longitudinal axis 220 of marking end effector 210. By way of example and not limitation, withdrawing marking end effector 210 may comprise breaking contact with target surface 600, and/or moving away from target surface 600.

In particular embodiments, marking end effector 210 may automatically reset to its uncompressed or initial configuration. By way of example and not limitation, marking end effector 210 may automatically reset based on one or more biasing systems provided therewithin, such as marker springs 425 engaging and acting on individual markers 500, marker holder assembly spring 380 engaging and acting on the marker holder assembly 400, or a combination thereof.

While this disclosure may describe particular operational aspects of marking end effector 210, including but not limited to withdrawal, translation, compression, rotation, and/or resetting, as discrete events and effects that may appear separately attributable to particular features or design aspects, it should be appreciated that operational aspects may not be discrete, and/or may be based on cooperative or interactive effects between particular features or design aspects. By way of example and not limitation, independent biasing systems comprising a separate marker spring 425 for each marker 500 may be designed to cooperate with each other, and/or with marker holder assembly spring 380, such as based on their relative critical dimensions, travel extents, and/or spring constants. Accordingly, by way of continuing example and not limitation, particular motions of extension or resetting may combine with particular other motions of compression. Such and other interactive and/or cooperative effects, as well as corresponding operational behavior which may not comport with the non-limiting examples provided herein are fully contemplated in this disclosure. It will also be appreciated that while particular components or assemblies may be disclosed to perform particular motions or actions, any suitable components or assemblies may be operated to perform any suitable motions or actions. By way of example and not limitation, a translation, advancement, retreat, and/or other motion described herein to be performed by marking end effector 210 has been so described to provide a better understanding. One or more of such or other actions, operations, and/or motions may be performed by a portion, subset, and/or superset, of the described component or assembly, and/or another suitable component or assembly.

FIG. 7 illustrates schematic exemplary indicia applied on a target surface, according to particular embodiments.

In particular embodiments, a pattern or indicia marked on target surface 600 may be centered about the longitudinal axis of the end effector. In particular embodiments, a pattern or indicia marked on target surface 600 may comprise a radius equal to a radial offset distance 460 between a bore axis 465 of a corresponding marker 500 and a longitudinal axis 220 of marking end effector 210. In particular embodiments, specific features of a pattern or indicia marked on target surface 600 may be based on one or a combination of factors. By way of example and not limitation, factors affecting features of a pattern or indicia marked on target surface 600 by marking end effector 210 may include one or more of: a number of markers 500 contacting target surface 600, an angle of rotation about a longitudinal axis between initial contact with target surface 600 and a stopping point of interest, such as breaking contact with target surface 600, and/or an angle of bore axis 465 or housing marker 500 relative to a longitudinal axis 220 of marking end effector 210.

By way of example and not limitation, a pattern or indicia marked on target surface 600 may comprise one or a plurality of individual marks. By way of example and not limitation, a pattern or indicia marked on target surface 600 may comprise circular patterns and/or part(s) thereof, spiral patterns and/or part(s) thereof, one or more straight lines, and/or other patterns of interest.

By way of example and not limitation, FIG. 7 schematically illustrates two adjacent indicia respectively applied by particular embodiments of marking end effector 210 about two adjacent targets 610 on a target surface 600. Continuing by way of non-limiting example, FIG. 7 depicts a marked indicia associated with each target 610 to be four arc segments or discrete portions of a circle, with an approximately constant radius of curvature carrying through the marking extent of each discrete portion, as well as across discrete portions. A total number of markers 500 and a total rotation of marker holder assembly 400 is configured in this non-limiting example to produce marked arc segments that are longer than the gaps between the arc segments.

Figure 8:
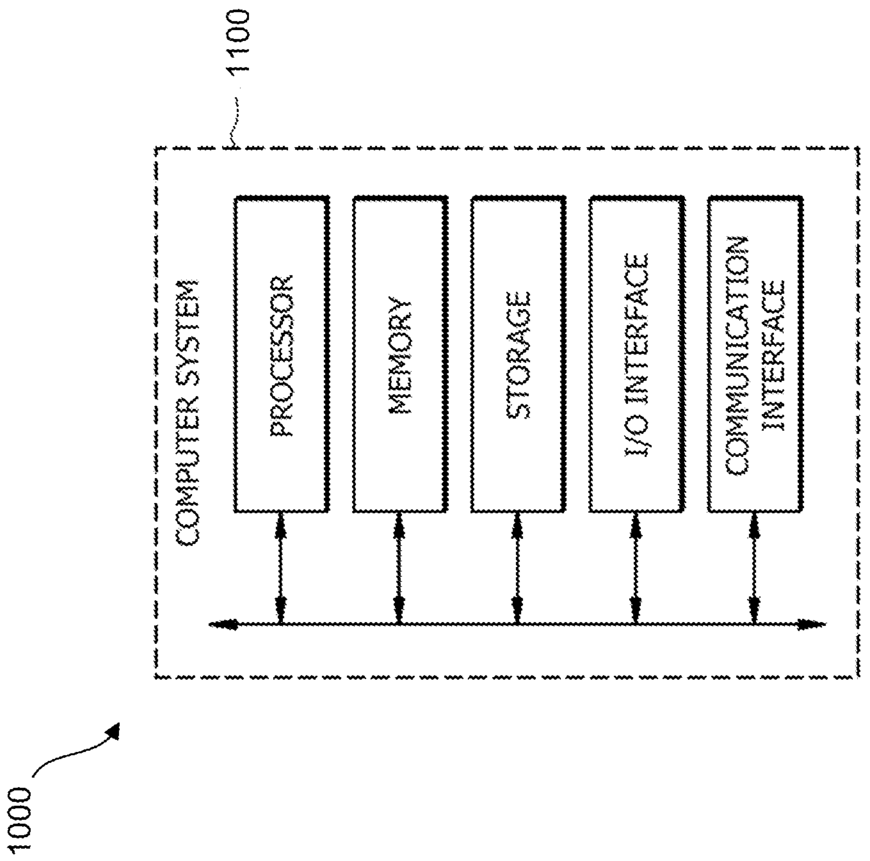
FIG. 8 illustrates a computing system communicatively coupled to a robotic system, according to particular embodiments.

FIG. 8 illustrates an example of elements 1100 that may be included in computing system 1000, according to certain embodiments. For example, computing system 1000 may include one or more interface(s), processing circuitry, memory or memories, and/or other suitable element(s). Interface receives input, sends output, processes the input and/or output, and/or performs other suitable operation. Interface may comprise hardware and/or software.

Processing circuitry performs or manages the operations of the component. Processing circuitry may include hardware and/or software. Examples of a processing circuitry include one or more computers, one or more microprocessors, one or more applications, etc. In certain embodiments, processing circuitry executes logic (e.g., instructions) to perform actions (e.g., operations), such as generating output from input. The logic executed by processing circuitry may be encoded in one or more tangible, non-transitory computer readable media (such as memory). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory (or memory unit) stores information. Memory may comprise one or more non-transitory, tangible, computer-readable, and/or computer-executable storage media. Examples of memory include computer memory (for example, Random Access Memory (RAM) or Read-only Memory (ROM)), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL™ cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. For example, it is possible that each of the characteristics described in one of the examples of an embodiment can be combined with one or a plurality of other desired characteristics from other embodiments, resulting in other embodiments not described in words or by reference to the drawings. It will also be understood that changes and modifications may be made by those of ordinary skill within the scope of the disclosure, illustrations, and/or the following claims. Such variations are fully contemplated herein and not to be regarded as a departure from the disclosure, and all such modifications are intended to be included within the scope of the disclosure.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

It should be noted that figures provided herein may be illustrated schematically rather than literally or precisely; components and aspects of the figures may not necessarily be to scale. Moreover, while like reference numerals may designate corresponding parts throughout the different views in many cases, like parts may not always be provided with like reference numerals in each view. Further, like parts may not be labeled in every view or figure, for reasons of clarity.

Numerical ranges recited in this application should be construed to be inclusive of the end points of the stated ranges. Particular axes, such as one or more rotational, lateral and/or longitudinal axes, which may be omitted herein in some illustrations, should be construed to exist in every illustration or situation where it is referred to, or to which it reasonably corresponds to.

The invention claimed is:

1. A marking end effector for a robotic system configured to mark a target surface using one or more markers, the end effector having a longitudinal axis and comprising:

- a housing having a proximal end coupled to an end effector base and comprising:
  - a cylindrical cavity provided at a distal end of the housing, the cavity having a cavity wall and a cavity base disposed within the housing; and
  - a first guide slot provided in the cavity wall and comprising a helical portion;
- a marker holder assembly operatively coupled to the housing and comprising:
  - a cylindrical marker holder configured to be received by the cavity;
  - a first guide bearing disposed on the marker holder, the first guide bearing supported by a first bearing axle operatively coupled to the marker holder; and
- one or more marker bores provided within the marker holder and circumferentially distributed about the longitudinal axis, each marker bore configured to receive a respective marker of the one or more markers; and
- a marker holder biasing member comprising a spring provided between the cavity base and the marker holder assembly and configured to apply a longitudinal biasing force on the marker holder assembly,
- wherein the first guide bearing is configured to operatively engage with the first guide slot of the housing to support and guide a motion of the marker holder relative to the housing, and
- wherein, based on placing a first contacting marker of the one or more markers in contact with the target surface and advancing the end effector toward the target surface, the first guide bearing engages the first guide slot, which causes the marker holder to mechanically rotate about the longitudinal axis of the end effector in an initial direction while translating toward the cavity base of the housing, and the first contacting marker marking the target surface with at least a portion of first indicia, the first indicia centered about the longitudinal axis of the end effector.

2. The end effector of claim 1, wherein, based on withdrawing the end effector away from the target surface subsequent to advancing the end effector toward the target surface, the marker holder resets by rotating opposite to the initial direction while translating away from the cavity base of the housing.

3. The end effector of claim 1, wherein the marker holder assembly further comprises a locking mechanism provided at a distal end of the marker holder, the locking mechanism comprising one or more marker bores and configured to constrain and secure the one or more markers relative to the marker holder assembly.

4. The end effector of claim 3, wherein the locking mechanism further comprises one or more lockable members configured to selectively apply a lateral force to constrain and secure the one or more markers relative to the marker holder assembly based on locking the locking mechanism.

5. The end effector of claim 4, wherein one or more of the selectively lockable members comprises a threaded shaft cooperatively engaged with a threaded bore.

6. The end effector of claim 1, the housing further comprising one or more second guide slots provided in the cavity wall, each guide slot comprising a helical portion, the marker holder assembly further comprising one or more second guide bearings circumferentially provided on the marker holder, each guide bearing supported by a respective second bearing axle operatively coupled to the marker holder, wherein each second guide bearing is configured to operatively engage with a respective second guide slot to support and guide a motion of the marker holder relative to the housing.

7. The end effector of claim 1, wherein each marker bore is disposed parallel to the longitudinal axis, wherein each marker bore is radially offset from the longitudinal axis by a radial offset distance, and wherein the first indicia centered about the longitudinal axis comprises a first radius equal to the radial offset distance.

8. The end effector of claim 7, further comprising a second contacting marker of the one or more markers, the first contacting marker and the second contacting marker configured to apply a pattern on the target surface comprising at least a portion of a circle, the pattern centered about the longitudinal axis of the end effector and having the first radius equal to the radial offset distance, based on placing the first contacting marker and the second contacting marker in contact with the target surface and advancing the end effector toward the target surface.

9. The end effector of claim 8 comprising a plurality of second contacting markers.

10. The end effector of claim 8, wherein the marker holder assembly further comprises a marker holder bottom plate provided at a proximal end of the marker holder, and wherein the marker holder biasing member engages the marker holder bottom plate to apply the longitudinal biasing force.

11. The end effector of claim 10, wherein the marker holder bottom plate comprises a marker alignment assembly configured to permit the first contacting marker and the second contacting marker to independently adjust for operatively engaging with an uneven target surface or an angled target surface.

12. The end effector of claim 10, wherein the marker holder bottom plate comprises a marker spring and a marker spring plate for each of the first contacting marker and the second contacting marker to facilitate an independent axial extension or compression of each of the first contacting marker and the second contacting marker relative to a reference distal face of the end effector.

13. The end effector of claim 12, wherein, based on withdrawing the end effector away from the target surface subsequent to advancing the end effector toward the target surface, the first contacting marker and the second contacting marker are realigned with an equal axial extension relative to the reference distal face of the end effector.

14. A robotic system comprising:

a memory;

a processor in communication with the memory;

a robot in communication with the processor and configured to manipulate one or more end effectors based on communication with the processor, the robot comprising:

a marking end effector configured to mark a target surface using one or more markers, the end effector having a longitudinal axis and comprising:

a housing having a proximal end coupled to an end effector base and comprising:

a cylindrical cavity provided at a distal end of the housing, the cavity having a cavity wall and a cavity base disposed within the housing; and a first guide slot provided in the cavity wall and comprising a helical portion;

a marker holder assembly operatively coupled to the housing and comprising:

a cylindrical marker holder configured to be received by the cavity;

a first guide bearing disposed on the marker holder, the first guide bearing supported by a first bearing axle operatively coupled to the marker holder; and one or more marker bores provided within the marker holder and circumferentially distributed about the longitudinal axis, each marker bore configured to receive a respective marker of the one or more markers; and a marker holder biasing member comprising a spring provided between the cavity base and the marker holder assembly and configured to apply a longitudinal biasing force on the marker holder assembly, wherein the first guide bearing is configured to operatively engage with the first guide slot of the housing to support and guide a motion of the marker holder relative to the housing, and wherein, based on placing a first contacting marker of the one or more markers in contact with the target surface and advancing the end effector toward the target surface, the first guide bearing engages the first guide slot, which causes the marker holder to mechanically rotate about the longitudinal axis of the end effector in an initial direction while translating toward the cavity base of the housing, and the first contacting marker applies at least a portion of first indicia on the target surface, the first indicia centered about the longitudinal axis of the end effector.

15. The robotic system of claim 14, wherein each marker bore is disposed parallel to the longitudinal axis, wherein each marker bore is radially offset from the longitudinal axis by a radial offset distance, and wherein the first indicia centered about the longitudinal axis comprises a first radius equal to the radial offset distance.

16. The robotic system of claim 15, further comprising a second contacting marker of the one or more markers, the first contacting marker and the second contacting marker configured to apply a circular pattern on the target surface, the circular pattern centered about the longitudinal axis of the end effector and having a first radius equal to the radial offset distance, based on placing the first contacting marker and the second contacting marker in contact with the target surface and advancing the end effector toward the target surface.

17. The robotic system of claim 16 comprising a plurality of second contacting markers.

18. A method of operating a robotic system having a marking end effector, the method comprising:

aligning a longitudinal axis of the marking end effector with a target on a target surface;

providing initial contact of a plurality of markers with the target surface, each marker of the plurality of markers secured within a cylindrical marker holder and circumferentially distributed about the longitudinal axis, the marker holder received by a cavity of a housing of the end effector, wherein a plurality of guide bearings coupled to the marker holder are respectively supported and guided by guide slots provided in the cavity, each guide slot comprising a helical portion and configured to permit a rotation and a translation of the marker holder relative to the housing, wherein the end effector comprises a marker holder biasing member comprising a spring provided between a cavity and the marker holder assembly and configured to apply a longitudinal biasing force on the marker holder assembly;

advancing the marking end effector toward the target surface along the longitudinal axis;

mechanical aligning the marker holder to rotate about the longitudinal axis in an initial direction while translating toward a base of the cavity of the housing, the mechanical alignment based on advancing the marking end effector, wherein, based on placing a first contacting marker of the plurality of markers in contact with the target surface and advancing the end effector toward the target surface, the first guide bearing engages the first guide slot, which causes the marker holder to mechanically rotate about the longitudinal axis of the end effector in an initial direction while translating toward the cavity of the housing;

marking the target surface using one or more of the plurality of markers with a pattern comprising at least a portion of a circle, the pattern centered about the longitudinal axis;

withdrawing the marking end effector away from the target surface along the longitudinal axis; and mechanical realigning the marker holder to reset by rotating the marker holder opposite to the initial direction while translating the marker holder away from the base of the cavity, the mechanical realignment based on withdrawing the marking end effector.

19. The method of claim 18, wherein prior to or during advancing the marking end effector, the method further comprises separately aligning each marker of the plurality of markers, the separate alignment permitted by a marker alignment assembly provided within a marker holder bottom plate and facilitating operative engagement of the plurality of markers with an uneven target surface or an angled target surface.

20. The method of claim 19, wherein the separate alignment comprises an independent axial extension or compression of each marker, and the marker alignment assembly comprises a marker spring and a marker spring plate.

* * * * *